Oct. 5, 1965

B. T. HOWES ETAL 3,209,536

RE-EXPANSION TYPE GAS TURBINE ENGINE WITH
INTERCOOLER FAN DRIVEN BY THE LOW
PRESSURE TURBINE

Filed April 4, 1960

BENJAMIN T. HOWES
IVAN M. SWATMAN
INVENTORS

BY John R. Faulkner
Keith L. Zerschling

ATTORNEYS

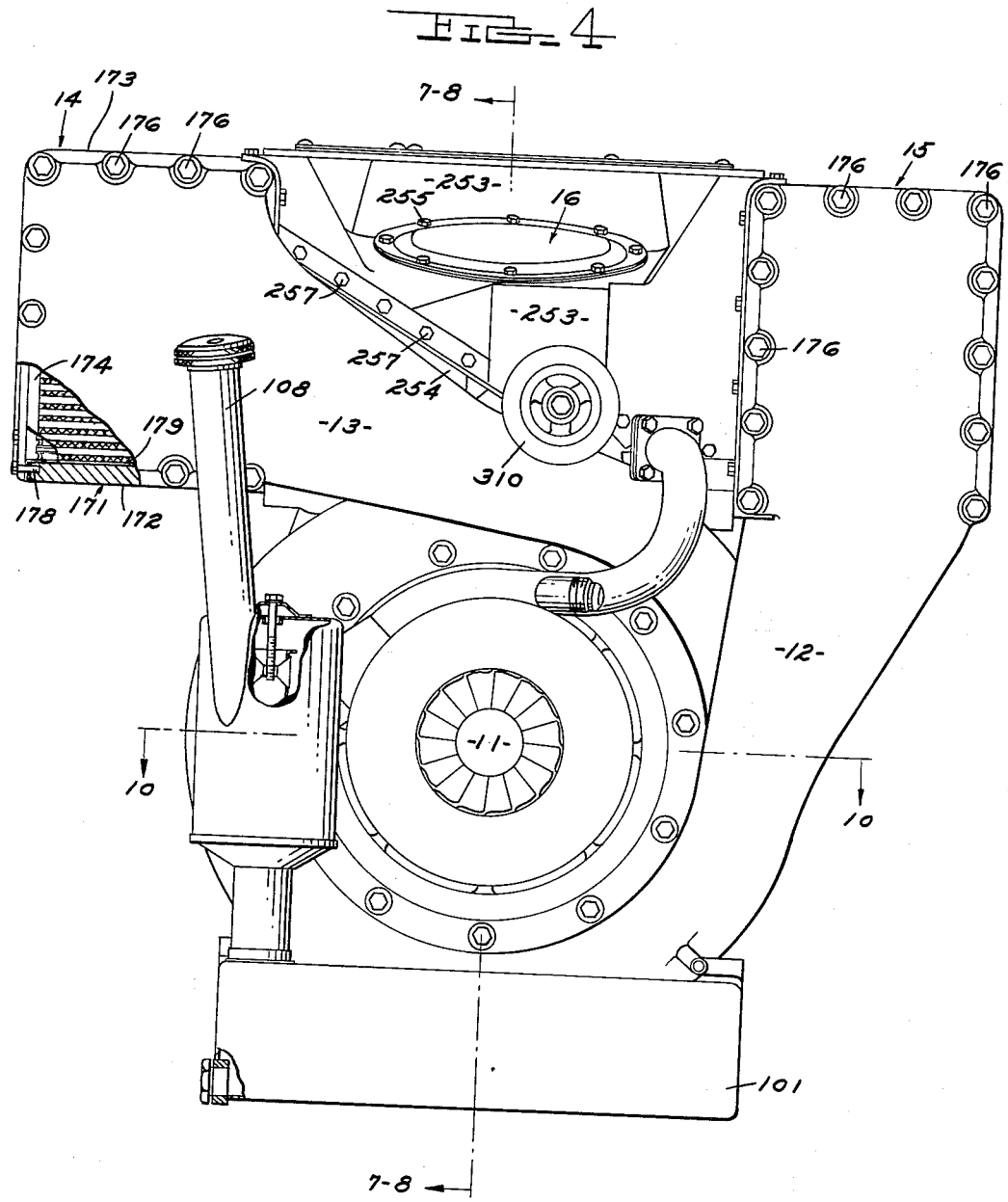

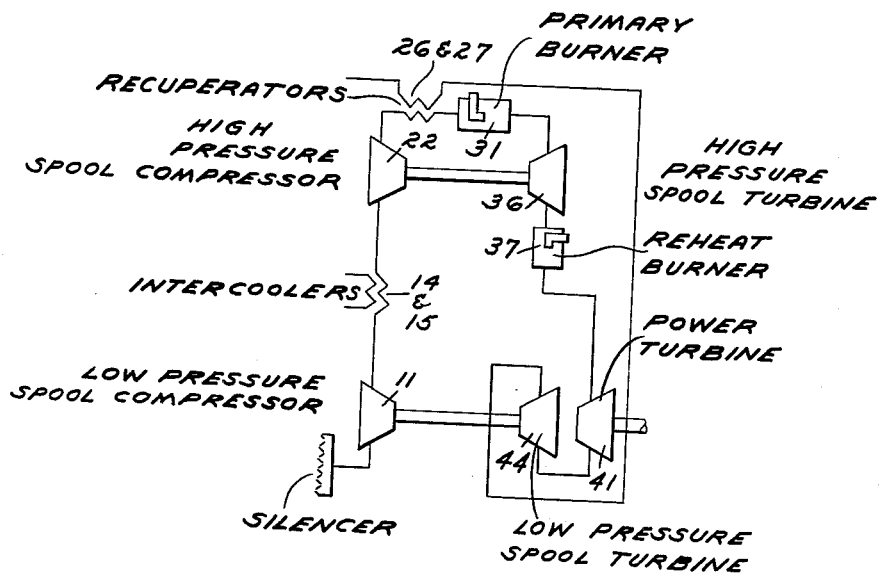
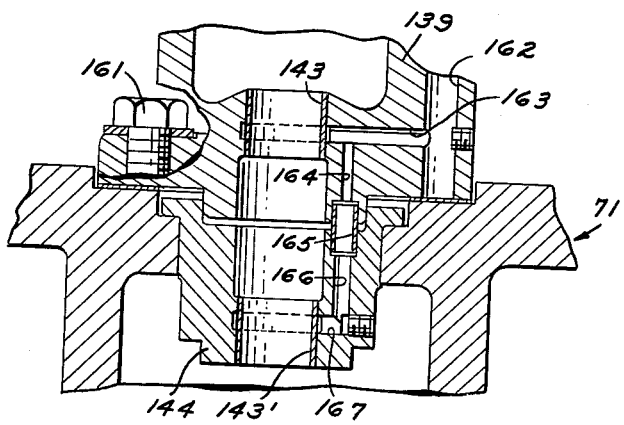

Oct. 5, 1965   B. T. HOWES ETAL   3,209,536
RE-EXPANSION TYPE GAS TURBINE ENGINE WITH
INTERCOOLER FAN DRIVEN BY THE LOW
PRESSURE TURBINE
Filed April 4, 1960   13 Sheets-Sheet 5

BENJAMIN T. HOWES
IVAN M. SWATMAN
INVENTORS

BY

ATTORNEYS

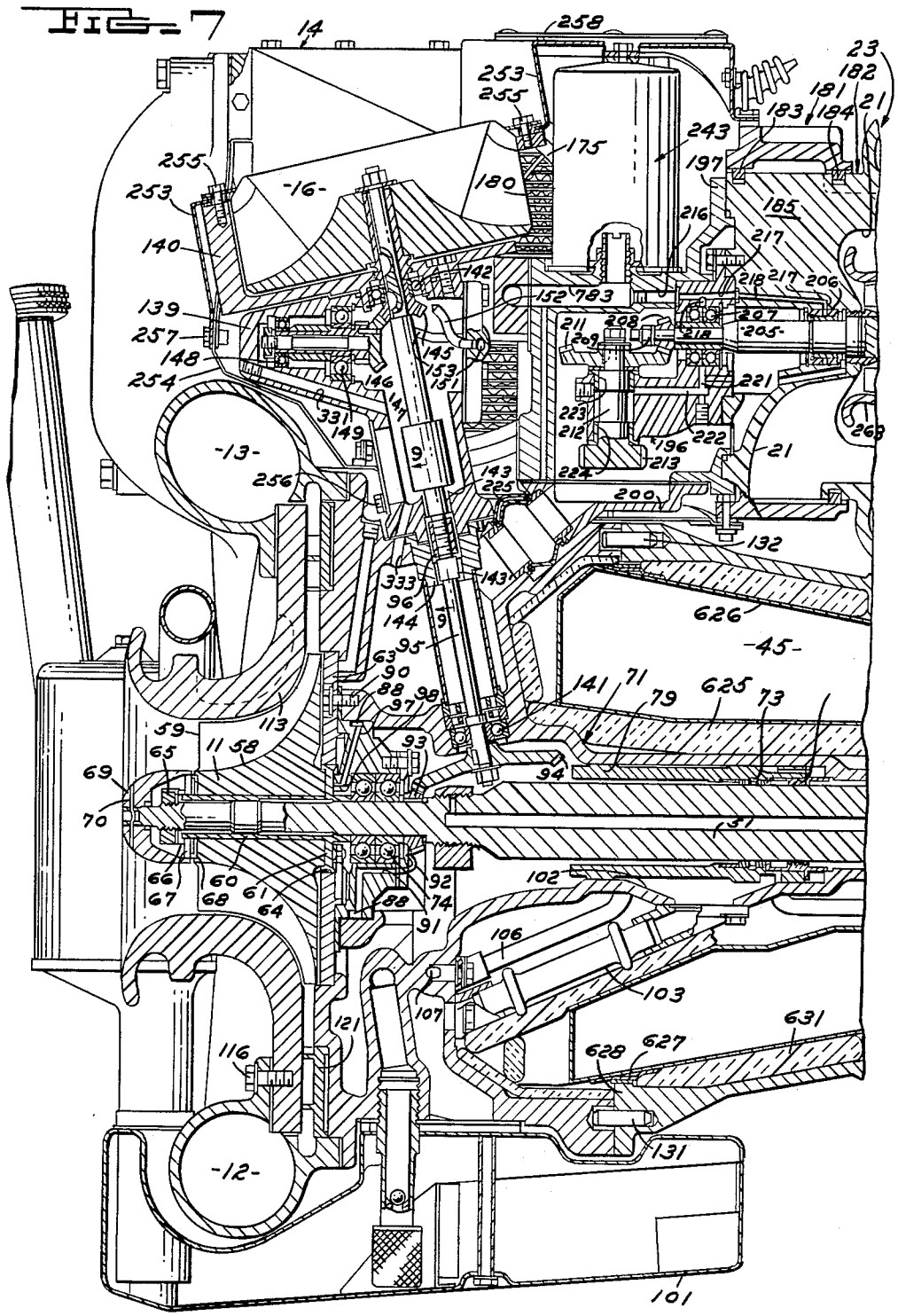

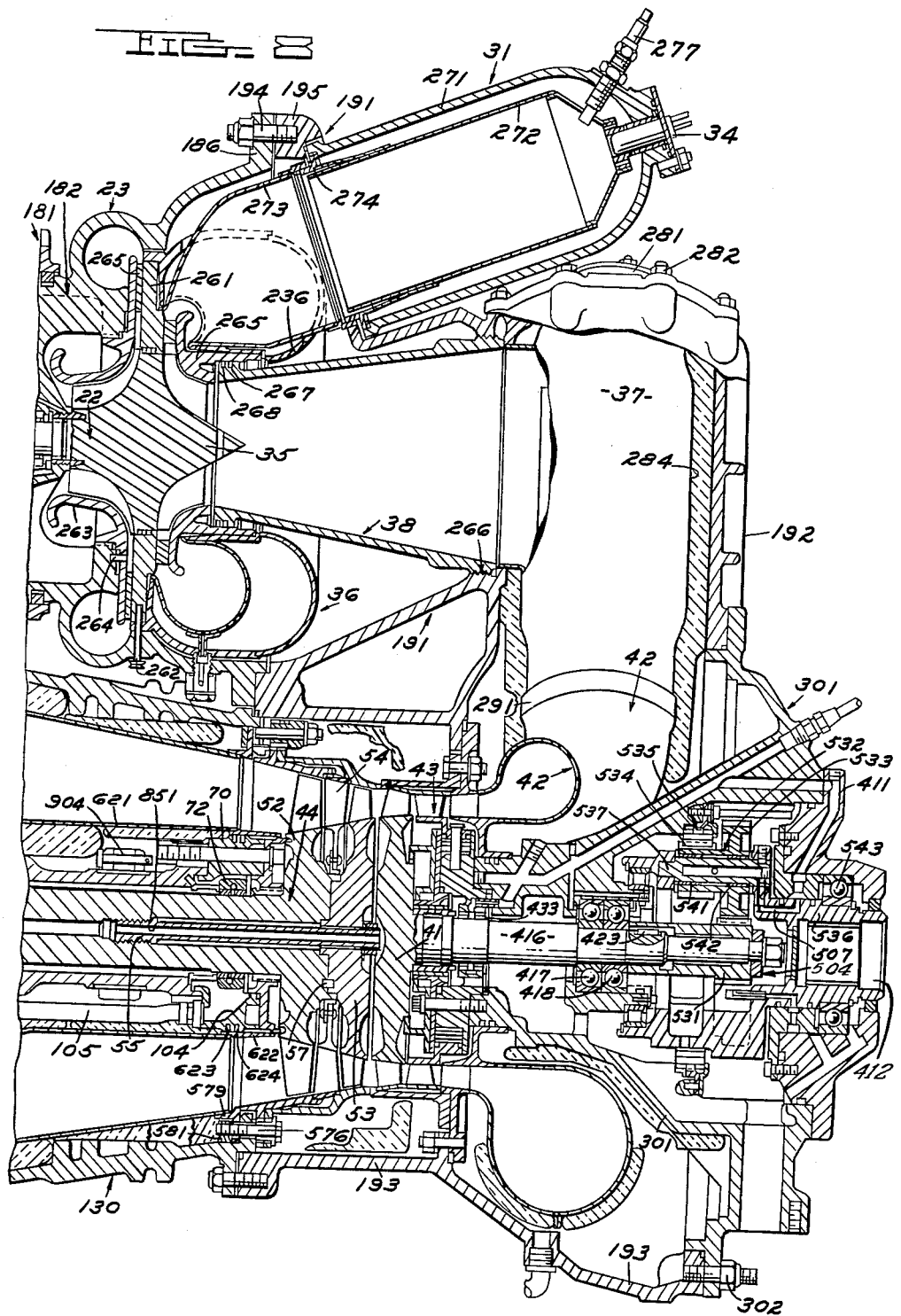

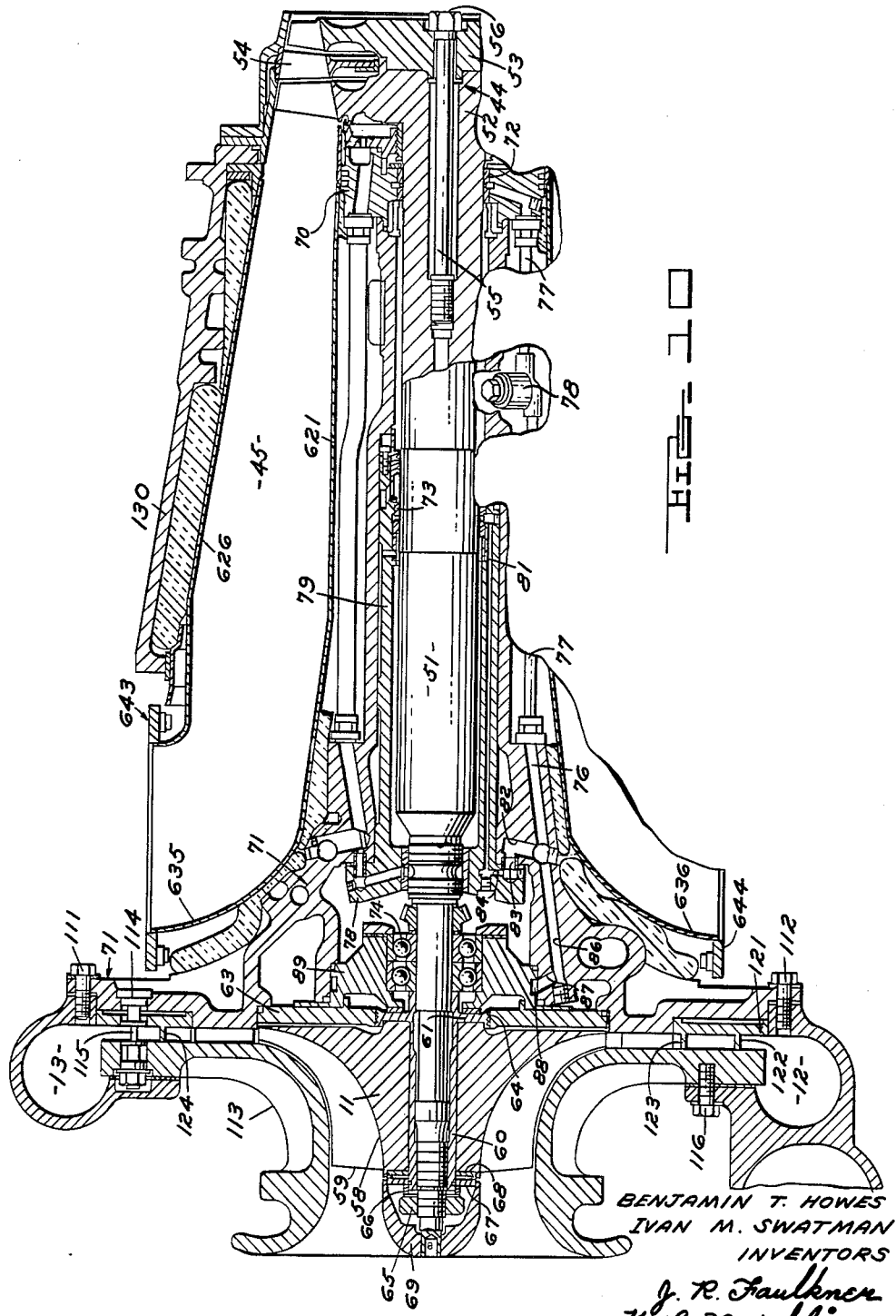

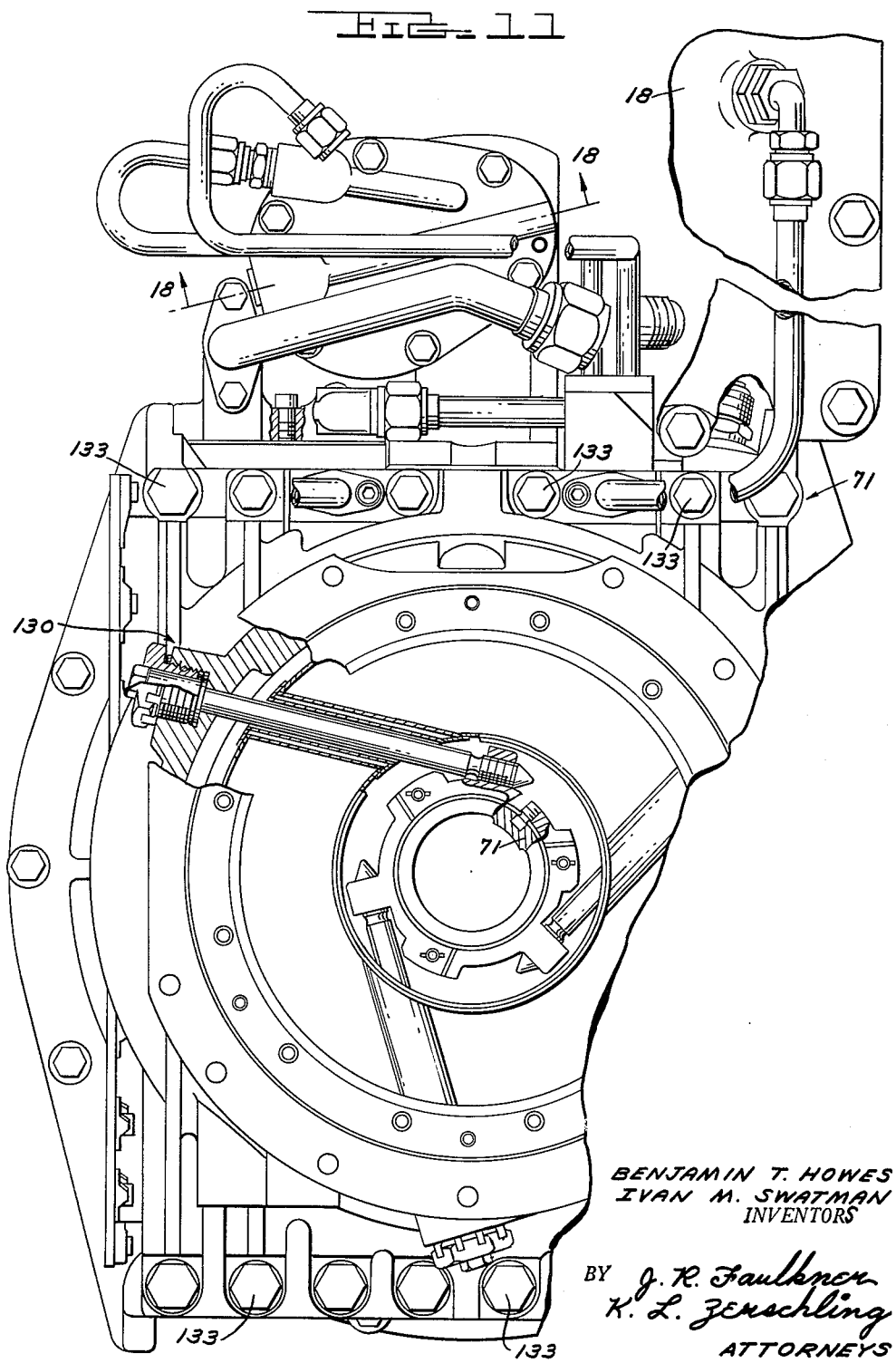

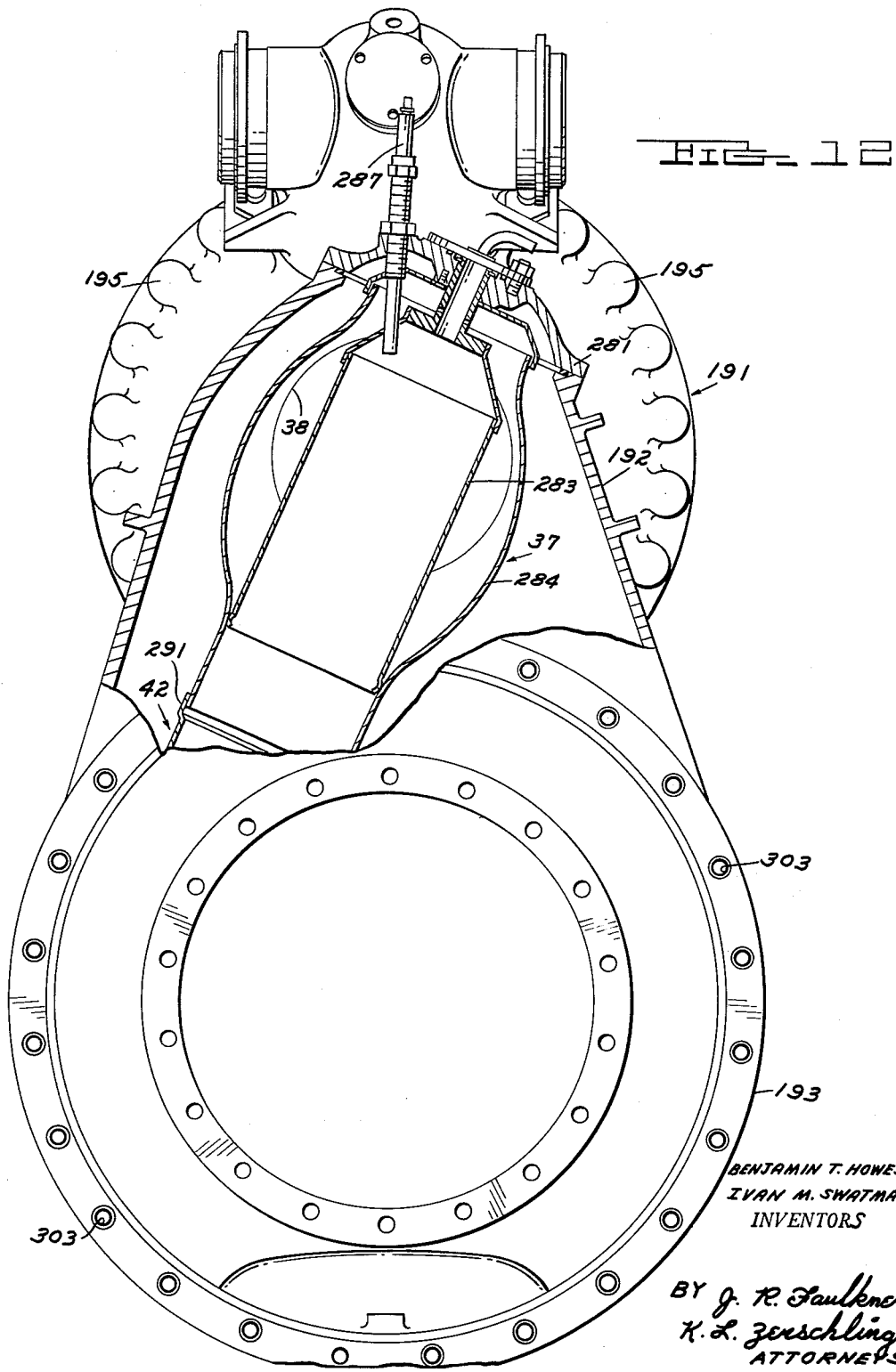

BENJAMIN T. HOWES
IVAN M. SWATMAN
INVENTORS

BY J. R. Faulkner
K. L. Zerschling
ATTORNEYS

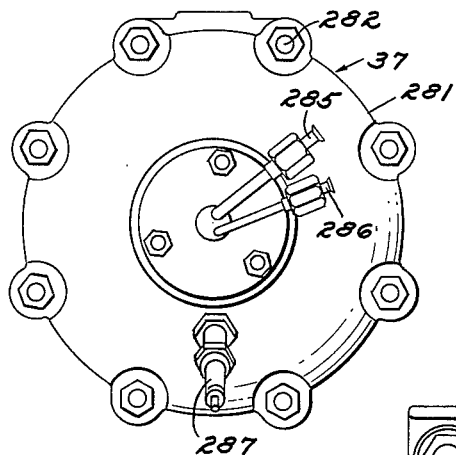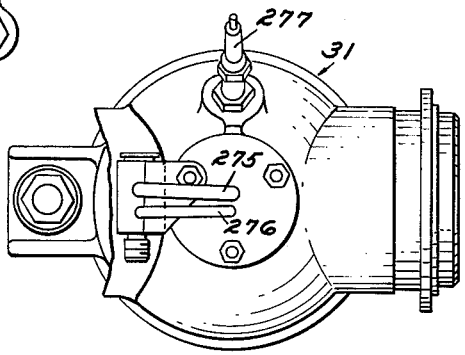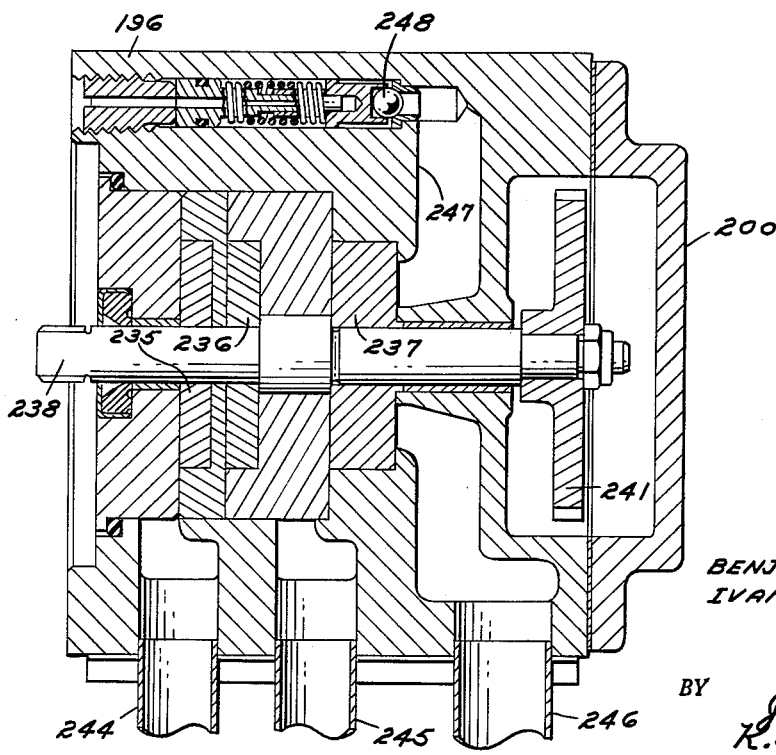

3,209,536
RE-EXPANSION TYPE GAS TURBINE ENGINE
WITH INTERCOOLER FAN DRIVEN BY THE
LOW PRESSURE TURBINE
Benjamin T. Howes and Ivan M. Swatman, Birmingham,
Mich., assignors to Ford Motor Company, Dearborn,
Mich., a corporation of Delaware
Filed Apr. 4, 1960, Ser. No. 19,797
8 Claims. (Cl. 60—39.16)

This invention relates to a gas turbine engine and more particularly to a compact gas turbine engine suitable for use in an automotive vehicle.

A growing trend toward increased horsepower for highway haulers, together with military requirements for air-transportable vehicles, indicates that piston engines may soon prove inadequate within the weight limitations imposed. The gas turbine engine with its inherent advantages of compact components and continuous energy release can produce much more power than a piston engine of the same size and weight. In addition, gas turbine engines have fewer moving parts than piston engines and no liquid cooling system need be employed.

In automotive use, gas turbine engines must be operated over a broad spectrum of loads and speeds. Gas turbine engines previously contemplated for automotive use, simple-cycle, low pressure gas turbine engines, while mechanically uncomplicated, have a part load fuel economy which is not competitive with gasoline or diesel engines.

The present invention provides a gas turbine engine, suitable for use in an automotive vehicle, which has good fuel economy over a broad spectrum of loads and speeds. This is accomplished by providing a high pressure engine cycle in which a two-spool gas generator supplies hot gas to an independent power turbine. More particularly, the gas turbine engine of the present invention includes a low pressure spool having a compressor and a turbine, a high pressure spool having a compressor and a turbine, a power turbine, a primary burner and a secondary or reheat burner. Additionally, it may include intercoolers connected between the low pressure spool compressor and the high pressure spool compressor, and recuperators connected between the high pressure spool compressor and the primary burner.

As will be more fully explained subsequently, air at atmospheric conditions is taken into the engine and compressed by the low pressure spool compressor and is then fed to the high pressure spool compressor through twin intercoolers positioned on either side of the low pressure and high pressure spools. The low pressure and high pressure spools are preferably positioned parallel to each other with the high pressure spool being positioned above the low pressure spool. The intercoolers are preferably of a cross flow type and employ air at atmospheric conditions as the cooling fluid. The cooling fluid is preferably forced through the intercoolers by a fan driven from the low pressure spool. The intercoolers reduce the temperature of the air flowing from the low pressure spool compressor thereby reducing the work of the high pressure spool compressor.

The compressed air from the high pressure spool compressor is then divided into two flow paths and passes to twin recuperators, one on each side of the engine. The recuperators heat the compressed air by means of heat transfer from the engine exhaust gases before it is supplied to the primary burner thereby reducing both the quantity of fuel required to power the engine and the exhaust gas temperature. From the recuperators, the air passes through dual inlets to the primary burner where heat is added by the combustion of fuel. Hot gases from the primary burner are supplied to the high pressure spool turbine which supplies the power for driving the high pressure spool compressor.

The gases from the high pressure spool turbine are then reheated in a secondary or reheat burner before being supplied to the power turbine. The power turbine and its shaft are aligned with the low pressure spool and the low pressure spool turbine is positioned immediately after the power turbine with respect to the flow of motive fluid. The power turbine and the low pressure spool turbine are preferably positioned in contra-rotating relationship with no nozzles interposed between them. The low pressure spool turbine is connected to power the low pressure spool compressor.

The exhaust gases from the low pressure spool turbine are then led to the twin recuperators mentioned above through a diffuser which surrounds the low pressure spool. From the recuperators the gases are exhausted to the atmosphere.

The high pressure spool operates near aerodynamic design speed and design inlet temperature through most of the load range. The low pressure spool then accelerates to a speed compatible with the load requirement of the engine. The near constant speed feature of the high pressure spool is largely instrumental in producing good fuel economy over a broad spectrum of loads and speeds, and particularly provides an advantage over simple cycle, low pressure gas turbine engines, that of good part load fuel economy.

The specific power of the gas turbine engine of the present invention is considerably higher than low pressure gas turbine engines, thus for a given power requirement, the weight, size and air flow of the gas turbine engine of the present invention is significantly lower than low pressure turbine engines. This permits the design of a high horsepower gas turbine engine which will fit into the engine compartments of modern day automotive vehicles.

An important feature of the gas turbine engine of this invention is its symmetrical design. In order to avoid eccentricities during thermal expansion and contraction of the component parts of the engine, the engine has been designed to be substantially symmetrical about a vertical plane passing through the centerline of the engine. In following this concept, twin intercoolers and twin recuperators, as discussed above, have been provided. Additional features showing this symmetry of design will become more fully apparent when the description of the engine is considered in connection with the drawings.

Another important feature of the invention is the arrangement of the components of the engine into a package which will conveniently fit into the engine compartment of a modern day automotive vehicle. The width and the height of the engine developed are substantially equal while the length thereof is slightly greater than the width and height.

As previously mentioned, the high pressure spool runs at a near constant speed over most of the load range of the engine, from 70% of rated speed at idle to 100% of rated speed at full power. The high pressure spool thus provides an excellent power source for the accessories associated with the engine and the vehicle in which the engine is mounted, such as, engine oil pumps, power steering pumps and an electrical generator. The pumps and generator provided can thus be substantially smaller than those employed with conventional engines since they operate over a speed range of 70%–100% of the rated speed of the high pressure spool.

The gas turbine engine of this invention is a high pressure high temperature machine. In order to limit severe stresses in the machine due to thermal expansion and contraction, and to reduce the amount of these thermal expansions and contractions, the gas turbine engine is constructed with thin ducts which carry the high temperature gas. The ducts are separated from the main housings of the machine, by means of suitable insulating material. In addition, the ducts are mounted within the housings so that relative movement is permitted between the ducts and the housings.

The engine is also constructed in a plurality of main parts or sections which are suitably fastened together. At least one of the connections is provided with a joint in which relative movement between sections is permitted. This joint is preferably positioned between the high pressure spool housing and the ducts leading from the intercoolers to the high pressure compressor, and comprises a cylindrical joint provided with piston rings. The ducts from the intercoolers are carried by the low pressure spool housing through the low pressure spool scrolls and the intercooler housings. This joint permits relative movement between major sections of the engine while simultaneously providing a fluid tight seal between these sections. This connection assists in reducing stresses which may have a tendency to build up as a result of differential expansion and contraction when thermal conditions within the engine change.

An object of the present invention is the provision of a gas turbine engine suitable for use in an automotive vehicle.

Another object of the invention is to provide a gas turbine engine, suitable for use in an automotive vehicle, having good fuel economy over a broad spectrum of loads and speeds.

A further object of the invention is the provision of a gas turbine engine having good part load fuel economy which is suitable for use in an automotive vehicle.

Another object of the invention is the provision of a gas turbine engine which has a symmetry of design with respect to its major components.

A further object of the present invention is the provision of a gas turbine engine having high specific power and hence a high horsepower to weight ratio.

Still another object of the invention is the provision of a gas turbine engine which will conveniently fit into the engine compartment of a modern day automotive vehicle.

A further object of the invention is to provide a gas turbine engine in which engine accessories are operated at substantially a constant speed.

Still another object of the invention is the provision of a gas turbine engine in which thermal expansions and contractions and the stresses produced thereby are reduced to a minimum.

Another object of the invention is the provision of a gas turbine engine having means for driving necessary automotive vehicle accessories, such as, a power steering pump and an air conditioner or refrigeration system compressor.

Other objects and attendant advantages of the present invention will become more readily apparent when the specification is considered in connection with the attached drawings in which, FIG. 1 is a perspective view of the gas turbine engine of the present invention;

FIG. 4 is a front elevational view of a slightly modified form of the gas turbine engine shown in FIG. 1 with the exception of the recuperators which are not shown;

FIG. 5 shows a schematic of the thermodynamic cycle of the gas turbine engine of the present invention;

Figure 13:
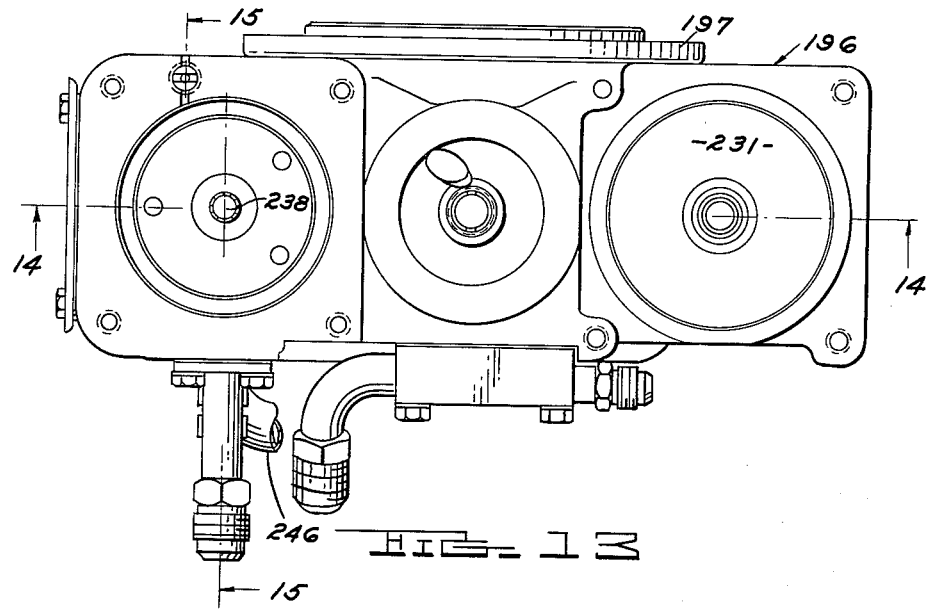
Figure 14:
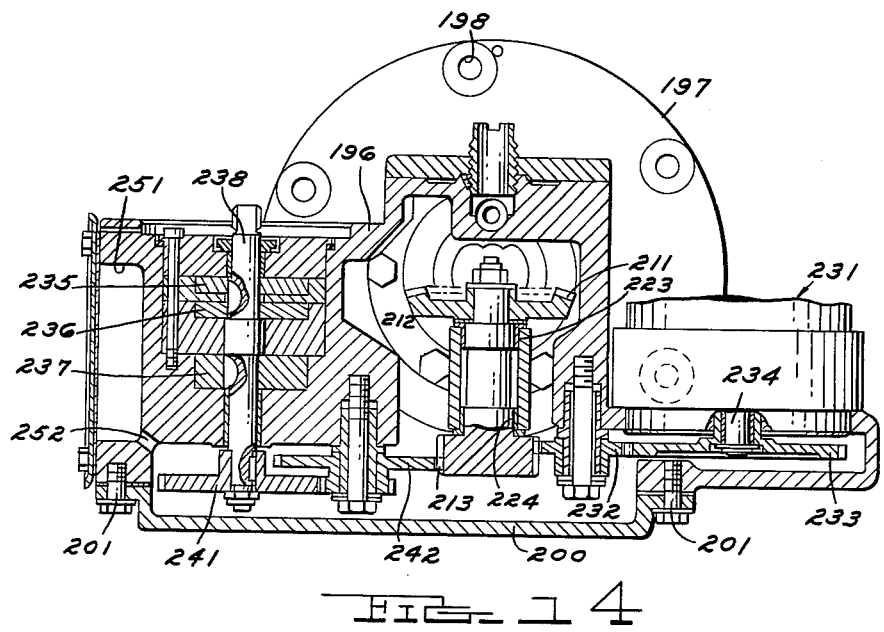
Figure 18:
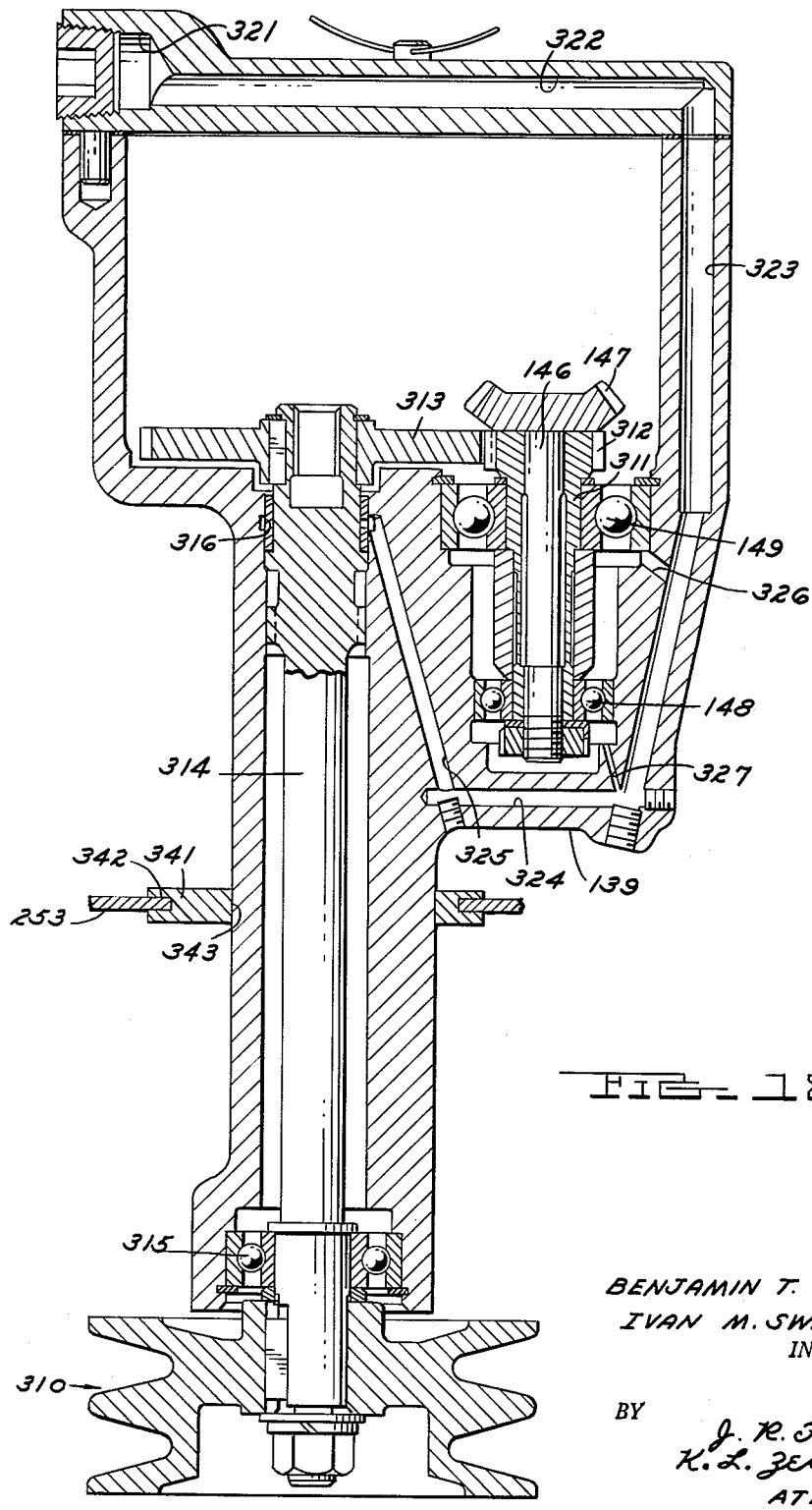

FIGS. 7 and 8, when disposed in side to side relationship, constitute a longitudinal sectional view of the gas turbine engine of the present invention taken along the lines 7—7 and 8—8 of FIG. 4;

FIG. 9 is a sectional view partially in elevation taken along the lines of 9—9 of FIG. 7 with the shaft omitted;

FIG. 10 is a partial longitudinal sectional view taken along the lines 10—10 of FIG. 4;

FIG. 11 is a rear elevational view partially in section of the low pressure spool housing and casing with other portions of the engine being shown in elevation;

FIG. 12 is a rear elevational view partially in section of the rear housing of the gas turbine engine;

FIG. 13 is a top plan view of the accessory gear box of the present invention;

FIG. 14 is a sectional view taken along the lines 14—14 of FIG. 13;

FIG. 15 is a sectional view taken along the lines 15—15 of FIG. 13;

FIG. 16 is an end view of the primary burner of the present invention which is shown in section in FIG. 8;

FIG. 17 is an end view of the reheat or secondary burner of the present invention which is shown in section in FIG. 12;

FIG. 18 is a sectional view taken along the lines 18—18 of FIG. 11 and showing one means for driving external power accessories, such as, a power steeling pump and an air or refrigerator compressor.

Referring now to the drawings in which like reference numerals designate like parts throughout the several views thereof, there is shown in 1 through 4 and 6 through 8 the overall arrangement of the major components of the gas turbine engine of the present invention. FIG. 5 shows these components and the cycle of the engine in schematic form.

Air is taken into the gas turbine engine of the present invention by means of a low pressure compressor, preferably a centrifugal compressor 11, where it is compressed prior to delivery to a pair of twin scrolls 12 and 13. The twin scrolls divide the air flow from the low pressure compressor for delivery to a pair of intercoolers 14 and 15. These intercoolers are of the cross-flow air to air type, and are supplied cooling air by a fan 16 which delivers cooling air outwardly from the center of the power plant through the intercooler structures. From the intercoolers, the cooled air is recombined by means of a pair of ducts 17 and 18 and is then fed into the inlet chamber 21 (see FIGS. 6 and 7) of high pressure spool compressor 22 which is preferably of the centrifugal type. The high pressure spool compressor further compresses the air and delivers it into scroll 23.

Figure 1:
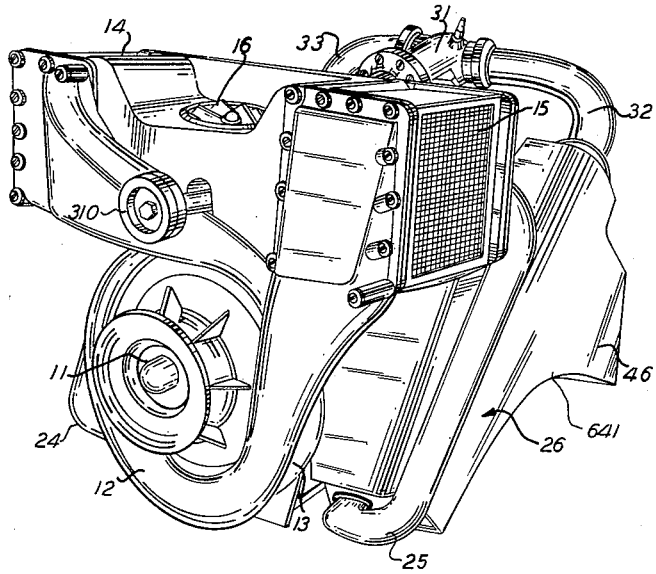

The air from the high pressure spool compressor is then divided into two flow paths by means of conduits 24 and 25 for delivery to a pair of recuperators 26 and 27 which are located on either side of the engine. As more fully disclosed in our copending application S.N. 70,463, these recuperators are of the cross-counter flow type and provide a means for heating the air from the high pressure compressor prior to the time it is delivered to a primary burner 31. As can readily be appreciated by an inspection of FIGS. 1 and 3, the heated air from the recuperators 26 and 27 is recombined in the primary burner 31 by means of conduits 32 and 33 which extend from the recuperators into either side of the burner 31.

The compressed air is then heated in the primary burner by the addition of fuel through the nozzle 34 (see FIG. 8) which may be of the recirculating type. The effluent from the primary burner is then delivered to a high pressure turbine 35, which is preferably of the radial inflow type, through a scroll 36. The high pressure turbine furnishes the power for driving the high pressure compressor, and these two devices together with the shaft for supporting them is known as the high pressure spool. The gases from the high pressure turbine are then delivered to a secondary or reheat burner 37 by means of a central conduit 38. The gases are then reheated to a high temperature in the reheat burner before being fed to a power turbine 41 through a scroll assembly 42 and a nozzle assembly 43

From the power turbine 41 the hot gases expand through a two-stage low pressure turbine, generally designated by the numeral 44, into a diffuser 45. The exhaust gases are then split and led into recuperators 26 and 27 as can best be seen by reference to FIG. 6 which clearly shows the connection between the diffuser 45 and the recuperator 26. As the exhaust gases flow through the recuperators heat transfer takes place between these exhaust gases, and the compressed air from the high pressure compressor 22. The cooled exhaust gases are then expelled to the atmosphere through exhaust conduits 46 and 47 which are formed integrally with the recuperator casings of recuperators 26 and 27. The low pressure compressor 11 and the low pressure turbine 44 together with their interconnecting shaft form the low pressure spool. As can be readily appreciated by an inspection of FIGS. 6, 7 and 8, the low pressure spool and the high pressure spool are disposed in parallel relationship with the high pressure spool being positioned above the low pressure spool.

Referring now to FIG. 5 which discloses the components and the cycle of the gas turbine engine of the present invention in schematic form, the temperatures and pressures at various points in the cycle will be given by way of example. It is to be understood in referring to FIG. 5 that the intercoolers represented by the symbol are actually the twin intercoolers 14 and 15, and that the recuperators shown in schmatic form are actually the twin recuperators 26 and 27 discussed above. At rated power for a 300 horsepower machine at 100° F. ambient temperature, 2.71 lbs. of air per second enters the low pressure spool compressor 11 which rotates at 46,500 r.p.m. A silencer may be previded to aid in eliminating the high pitch noise created by the compressor. The air is rated to a pressure of 58 p.s.i.a. and a temperature of 430° F. by this compressor and is then fed to the twin intercoolers 14 and 15 through twin scrolls 12 and 13. The intercoolers lower the temperature to 220° F. before it enters the high pressure compressor 22 where the pressure is raised to 224 p.s.i.a. and the temperature is raised to 625° F. The high pressure spool rotates at a speed of 91,500 r.p.m.

The compressed air is then fed to the twin recuperators 26 and 27 where the temperature of the air is raised to 960° F. at substantially constant pressure by heat transfer from the exhaust gases thereby reducing the quantity of fuel required and the temperature of the exhaust gases.

From the recuperators, the air passes through the dual conduits 32 and 33 to the primary burner 31 where the temperature is raised to 1700° F. by the continuous burning of fuel at substantially constant pressure. After the gases from the primary burner pass through the high pressure turbine where the temperature is reduced to 1300° F. and the pressure is reduced to 85 p.s.i.a., they are reheated in the reheat or secondary burner 37 to a temperature of 1700° F. at substantially constant pressure. The heated gas in then supplied to the power turbine 41 where the temperature is reduced to 1400° F. and the pressure is reduced to 40 p.s.i.a. In the low pressure turbine 44 and the diffuser 45 the gases expand to a pressure slightly above atmospheric at a temperature of 1070° F. The gases are then exhausted to the atmosphere through the twin recuperators 26 and 27 where the temperature is reduced to approximately 750° F.

The foregoing description described the gas turbine engine of the present invention in terms of its general components in order that the more detailed description which is to follow may be more easily comprehended and so that the relationship of the various elements and components may be more easily understood.

Referring now to FIGS. 6 through 8 and 10, the low pressure spool, the low pressure spool housing and associated elements will be explained in greater detail. The low pressure spool comprises the low pressure compressor 11, the two-stage low pressure turbine 44 and the interconnecting shaft which is designated by the numeral 51. The two-stage low pressure turbine 44 includes a first rotor 52 and a second rotor 53 with an interstage nozzle 54 interposed between them. The first rotor 52 may be formed integrally with the shaft 51 while the second rotor 53 is affixed to the shaft by means of a hollow bolt 55 and a nut 56. A plurality of pins, one of which is shown at 57, prevent relative rotation between the two turbine rotors.

The low pressure spool compressor 11 includes a hub 58 and blades 59, with the hub having a longitudinal bore for receiving a sleeve 60 which is press fitted into the bore. The sleeve 60 includes a radially extending flange 61 which together with a plate 63 affixed to the low pressure spool housing forms a labyrinth seal 64. The sleeve 60 is keyed to the low pressure spool shaft 51 and the hub is secured to the shaft by a nut 65 acting through a sleeve 66 and a pair of washers 67 and 68. The washer 67 may be a Belleville washer so that the load applied to the hub 58 by the nut 65 is equal at all points around the face of the hub. The Belleville washer also compensates in axial tension on the bolt for variations in thermal growth of the compressor 11. A covering hub or spinner 69 is also threaded onto shaft 51 and is held in place by a pin 70. This hub or spinner provides a smooth flow path for the air entering compressor 11.

The low pressure spool is rotatably mounted in a low pressure spool housing 71 by means of sleeve bearings 72 and 73 and a double ball bearing 74. These bearings are suitably lubricated by means of a lubrication system which is more fully described in our copending application S.N. 70,460, now Patent 3,170,292. Oil under pressure is supplied from this system to conduit 75 drilled in the low pressure spool housing 71. (See FIG. 10.) From this conduit the oil under pressure is supplied to the bearing 72, which is carried by bearing carrier 70, through conduit 76 drilled in the housing 71 and a pipe 77 which includes check valve 78. The sleeve bearing 73 is supported in a cylindrical sleeve 79 which is in turn supported by the low pressure spool housing. This sleeve has a longitudinal conduit 81 positioned therein which connects the sleeve bearing 73 to the oil under pressure in conduit 75 through conduit 82 drilled in the low pressure spool housing, transfer piece 83 and conduit 84 drilled in the sleeve.

Lubricating oil under pressure is also supplied to the double ball bearing 74 from the conduit 75 by means of conduits 86 and 87 in the low pressure spool housing 71, an annular passageway 88 in bearing carrier 89, passageway 91 in the bearing carrier and a transfer piece 92 connected to the passageway 91. The bearing carrier 89 is positioned within the low pressure spool housing 71 and is affixed thereto, along with plate 63, by means of a plurality of bolts, one of which is shown at 90. (See FIG. 7.) The transfer piece 92 directs oil upon the double ball bearing 74 and upon the mesh between bevel gear 93 affixed to the low pressure spool shaft 51 and the bevel gear 94 and the fan 16. The shaft 95 is formed from two pieces which are interconnected by a splined sleeve 96. Oil is also directed against the flange 61 of sleeve 60 via passageways 97 and 98 in the bearing carrier 89 to provide an anti-thrust bearing for the low pressure spool.

The gas turbine engine of this invention is provided with an oil sump 101 suitably affixed to the bottom portion of the low pressure spool housing 71. Scavenge oil from the double ball bearing 74 falls downwardly through the cored portion of the housing 71 into this sump. Similarly, scavenge oil from the sleeve bearing 73 is directed into the sump 101 from chamber or auxiliary sump 102 and pipe 103 which connects the chamber 102 to an open space in the housing 71. A labyrinth seal is positioned adjacent the bearing 73 to prevent any oil from going down the shaft in the direction of the sleeve bearing 72. This labyrinth seal assures that the scavenge oil from the sleeve bearing 73 will find its way into the chamber 102. Scavenge oil from the sleeve bearing 72 falls into a chamber or auxiliary sump 104 positioned in the bearing carrier 70, and is then directed to a scavenge pump, which will be described at a later point in the specification, by means of pipes 105, 106 and a conduit 107, which is formed by drilling of the low pressure spool housing 71. The sump 101 may be filled with oil by means of a fill pipe 108 shown in FIG. 4.

The scrolls 12 and 13 for the low pressure compressor 11 are bolted to the low pressure spool housing 71 by a plurality of bolts, two of which are shown at 111 and 112. (See FIG. 10.) A shroud 113 for the low pressure compressor 11 is piloted from the low pressure spool housing 71 by a plurality of shoulder bolts, one of which is shown at 114. Each of these bolts has a portion of reduced diameter 115 which extends across the flow path of the compressed air as it flows from the compressor into the scrolls 12 and 13. The shroud 113 is affixed to the scrolls 12 and 13 by a plurality of bolts denoted by the numeral 116. The diffuser 121 for the low pressure compressor 11 is positioned between the low pressure spool housing 71 and the shroud 113, and in addition, engages, at its outer diameter, a shoulder on the scrolls 12 and 13. The diffuser has a plurality of diffuser blades, some of which are shown in cross section at 122, 123 and 124.

The low pressure spool has an outer casing 130 positioned about the low pressure spool shaft 51 and that portion of the low pressure spool housing 71 which supports the shaft. (See FIG. 7.) This casing is affixed to the low pressure spool housing 71 by means of a plurality of dowel pins, two of which are shown at 131 and 132, and by a plurality of bolts 133 which are shown in FIG. 11.

As previously mentioned, the fan 16 is driven from the low pressure spool shaft 51 by means of the bevel gears 93, 94, and shaft 95. The shaft 95 is supported in the tioned adjacent the bevel gear 94. The shaft 95 is also low pressure spool housing by a ball bearing 141 positioned adjacent the bevel gear 94. The shaft 95 is also suppported in a fan housing composed of two pieces, designated by the numerals 139 and 140, by a ball bearing 142 positioned adjacent the fan 16 and by means of sleeve bearings 143 and 143'. The sleeve bearings are positioned in the fan housing member 139 and a support structure 144 positioned between the low pressure spool housing and the fan support member 139. The fan shaft 95 may have a beveled gear 145 affixed thereto adjacent the bearing 142 for driving a stub shaft 146 by means of an intermeshing bevel gear 147. This stub shaft is supported in the fan housing member 139 by means of a pair of ball bearings 148 and 149. The stub shaft 146 is employed to drive a shaft which may be used to drive external engine accessories, such as, a power steering pump and a refrigerant compressor. This structure will be explained more in detail in connection with FIG. 18.

Lubricating oil for the ball bearing 142 and for the intermeshing bevel gears 145 and 147 is supplied from conduit 151 in a plate affixed to the fan housing. This conduit has a pair of oil pipes 152 and 153 affixed thereto which force oil directly onto the bearing 142 and the intermeshing gears 145 and 147.

FIG. 9 discloses the structural supporting members for the sleeve bearings 143 and 143'. As shown here, the member 139 of the fan housing is secured to the low pressure spool housing 71 by a plurality of bolts, one of which is shown at 161. As can be seen by reference to this figure, the bearing support member 144 is positioned between the member 139 and the low pressure spool housing 71. Oil under pressure is supplied to the bearings 143 and 143' from a conduit 162 positioned in the fan housing member 139. The conduit 162 receives oil under pressure from the lubricating system of the engine as will be explained in detail at a later point in the specification. The oil from the conduit 162 is supplied to the bearing 143 by means of a conduit 163 positioned in the fan housing member 139 and to the bearing 143' by means of a conduit 164 positioned in the member 139, a transfer piece 165 and conduits 166 and 167 positioned in bearing support member 144. The lubricating oil for the bearing 141 is supplied by oil from the bearings 143 and 143' which drops downwardly from the bearings 143 and 143' onto the bearing 141.

Figure 3:
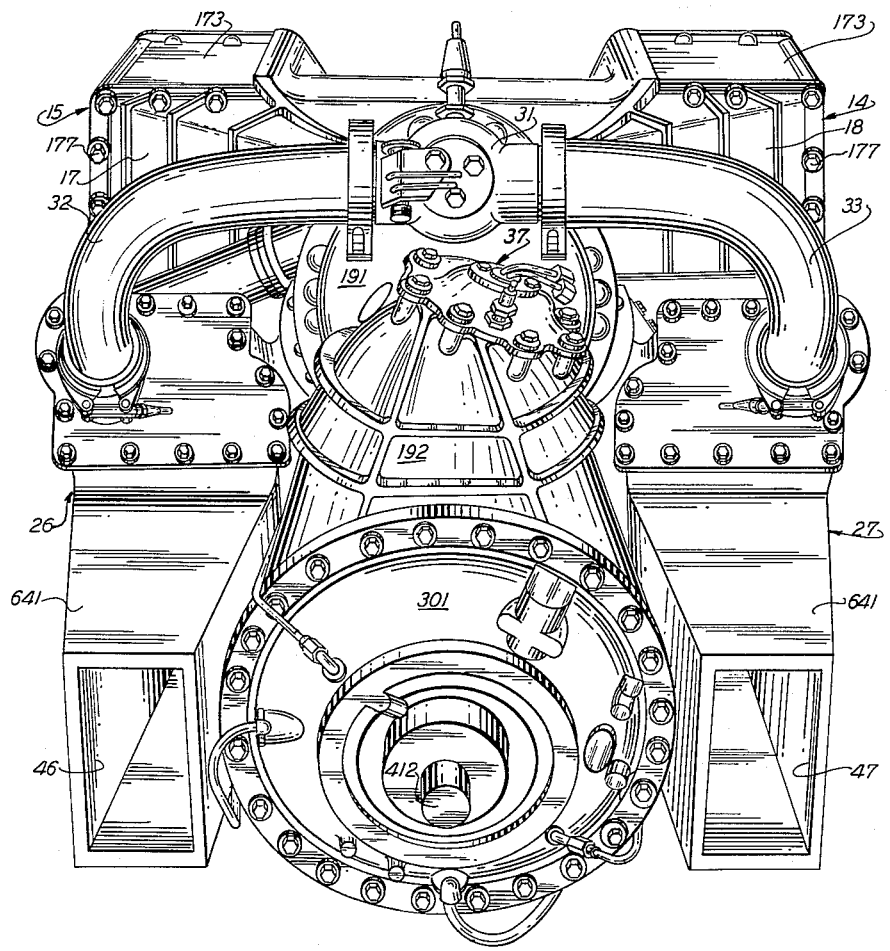
FIG. 3 is a rear perspective view of the gas turbine engine of FIG. 1 showing some of the components in more detail.

As previously mentioned, the intercoolers 14 and 15 are of the cross flow air to air type. These intercoolers have a top sheet metal member and a bottom sheet metal member which close the top and the bottom of each of the intercoolers. The intercoolers fit into intercooler housings, one of which is partially shown in FIG. 4, and denoted by the numeral 171. These intercooler housings have a bottom plate, designated by the numeral 172, a top plate 173, a pair of side posts, one of which is shown at 174, and an inner plate with a circular opening, as shown in FIG. 7, at 175. The intercooling housings are bolted to the scrolls 14 and 15 by a plurality of bolts as shown at 176, and to the ducts 17 and 18 which connect the intercoolers to the high pressure compressor by a plurality of bolts as shown at 177 (FIG. 3). The intercooler elements may be inserted into the housings from the outside of the engine, and they include inner circular openings which fit into the circular plates 175 of the housings 171. They may be secured in place by a plurality of bolts which engage an outer sheet metal member of the intercooler and the housing. One of these bolts is shown at 178 in FIG. 4. The intercooler elements per se, as shown by reference to FIGS. 4 and 7, include alternately positioned flow conduits which are directed perpendicularly with respect to each other. Alternate conduits designated by the numeral 179 conduct the air from the scrolls 12 and 13 to the ducts 17 and 18. The other conduits, directed perpendicularly to the conduits which conduct the air from the scrolls to the ducts previously mentioned, designated by the numeral 180 (see FIG. 7), direct air from the fan 16 outwardly from the center of the engine through the intercoolers.

Figure 6:
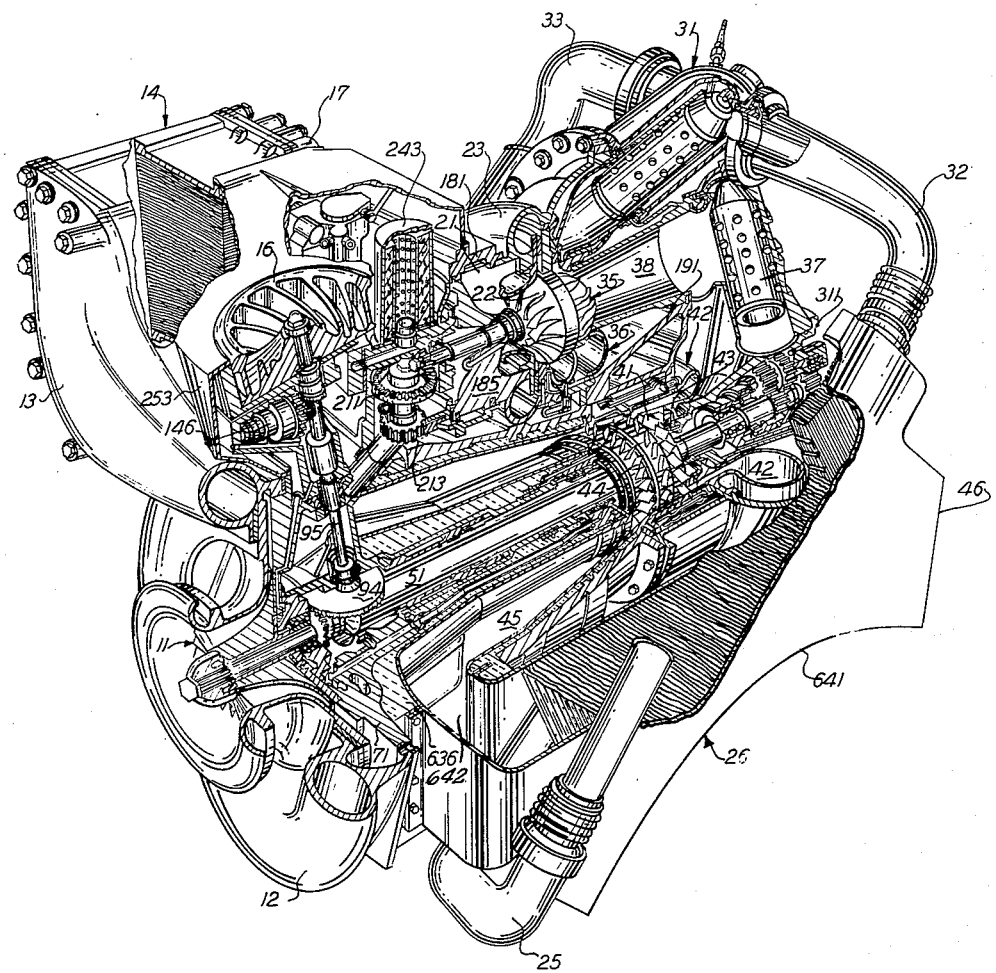
FIG. 6 is a perspective view of the gas turbine engine of the present invention with portions cut away.

The ducts 17 and 18 from the intercoolers 14 and 15 terminate at the center of the engine in a cylindrical structure denoted by the numeral 181 (see FIGS. 6 and 7). A high pressure spool housing, generally designated by the numeral 182, includes a cylindrical portion which fits within the cylindrical structure 181. Two piston rings, designated by the numerals 183 and 184, provide a fluid tight connection between these two structures while simultaneously permitting relative movement therebetween.

The high pressure spool housing includes the inlet 21 to the high pressure compressor 22. This inlet structure includes a plurality of struts, one of which is shown at 185, to give the inlet member structural rigidity. The high pressure spool housing also includes the high pressure compressor scroll structure 23, and a flange 186 for attaching the high pressure spool housing to the rear housing of the gas turbine engine, which is generally designated by the numeral 191.

This rear housing can best be seen by reference to FIG. 12, and includes a portion 192 for supporting the secondary or reheat burner 37 and a portion 193 for enclosing the power turbine 41, the low pressure spool turbine 44 and a reduction gear box. The high pressure spool housing and the rear housing are fastened together by a plurality of bolts, one of which is shown at 194 (FIG. 8). The rear housing has a plurality of protuberances 195 (FIG. 12) for receiving the bolts 194.

The high pressure spool housing 182 has affixed thereto an accessory gear box housing, generally designated by the numeral 196. The accessory gear box is shown in FIGS. 13 and 14, and as shown in FIG. 14, has a plate 197 with a plurality of apertures 198 for receiving the bolts (not shown), to affix the accessory gear box housing to the high pressure spool housing. The accessory gear box also includes a bottom pan 200 affixed to the housing 196 by a plurality of bolts 201 (FIG. 14).

As previously mentioned, the high pressure compressor 22 and the high pressure turbine 35 are combined in a back-to-back relationship, and are preferably one structural member. A shaft 205 extends from the compressor side of the combined compressor-turbine member, and is supported in the high pressure spool housing by means of a sleeve bearing, designated by the numeral 206. The shaft 205 is also supported in the accessory gear box housing by means of a double ball bearing 207. A gear 208 is affixed to the end of the shaft 205 by a nut 209, and this bevel gear meshes with another bevel gear 211 affixed to a shaft 212. A spur gear 213 affixed to the shaft 212 serves to drive a combined starter-generator for the engine, as well as a plurality of engine oil pumps which will be explained in detail at a later point in the specification.

Oil under pressure for lubricating the sleeve bearing 206 and the double ball bearing 207 is supplied from a conduit 216. From the conduit 216 oil flows into conduit 217 and to the sleeve bearing 206 through conduits 218 and 219. Oil for lubricating the bearing 207 flows into an annular channel 220, and a portion of this oil from the annular chanel also flows through conduits 221 and 222 to lubricate the sleeve bearings 223 and 224 which support the shaft 212. Oil from the bearings 206, 207, 223 and 224 flows into the bottom of the accessory gear box housing and from there into the cored openings in the low pressure spool housing 71 by means of a conduit 225 which connects the accessory gear box housing with the low pressure spool housing. From the cored openings in the low pressure spool housing the oil then finds its way into the sump 101.

Referring now to FIGS. 13 through 15, there is shown the accessory gear box including the housing 196. As previously discussed, the accessory gear box housing supports a bevel gear 211 driven by the bevel gear 208 affixed to the shaft 205 of the high pressure spool. The bevel gear 211 drives a spur gear 213 through the shaft 212. The spur gear 213 drives a combination starter-generator 231 through an idler gear 232 and a spur gear 233 affixed to a shaft 234 of the combination starter-generator. The spur gear 213 also drives three oil pumps, preferably of the Gerotor type, designated by the numerals 235, 236 and 237. The internal rotors of the Gerotor pumps are mounted on a common shaft 238 having a spur gear 241 affixed thereto. The spur gear 241 is driven by the spur gear 213 through an idler gear 242. The center section of the accessory gear box housing carries an oil filter 243, which can best be seen by reference to FIG. 7.

FIG. 15 shows an enlarged view of the three Gerotor pumps 235, 236 and 237, and also discloses inlet conduits 244, 245 and 246 to these Gerotor pumps. Engine lubricating oil is received by the Gerotor pump 237 from the inlet 246 and is discharged to an outlet conduit 247. A pressure relief valve 248 is provided in the outlet conduit 247 to prevent unduly high pressures from being developed in the pump 237. The Gerotor pump 236 receives oil from the inlet conduit 245 and the Gerotor pump 235 receives oil from the inlet conduit 244. Oil is discharged from these two pumps into chamber 251 in the accessory gear box housing (FIG. 14). The oil from the chamber 251 then flows through an opening 252 into the bottom pan 200 of the accessory gear box housing where it is discharged into the cored opening in the low pressure spool housing 71 by means of the conduit 225, as was previously explained in connection with FIG. 7.

As previously discussed, the pan 16 is driven from the low pressure spool 51 and, accordingly, it forces an amount of cooling air through the intercoolers 15 and 16 which is directly proportional to the amount of air compressed by the low pressure compressor 11 and delivered to the intercoolers by the scrolls 12 and 13.

The fan 16 is completely enclosed, except for an opening at the top of the engine and the openings through the intercoolers, by structural parts of the engine and by sheet metal members 253 and 254 which are affixed to the fan housing members 139 and 140 by bolts 255 and 256 (see FIGS. 4 and 7). The sheet metal members are also fastened together by means of a series of bolts 257. As can be appreciated by an inspection of FIG. 7, the fan 16 also directs air upon the accessories positioned within the accessory gear box housing, the top of which is closed by a plate 258. Thus the fan 16, not only supplies cooling air for the intercoolers 14 and 15 but surrounds the oil filter 243, the combination starter-generator 231 and engine oil pumps 235, 236 and 237 with cool air.

Referring now to FIG. 8, the high pressure spool housing 182 supports a labyrinth seal 261 and the scroll 36 for the high pressure spool turbine 35 by means of a plurality of radial pins, one of which is designated by the numeral 262. The labyrinth 261 prevents an interflow between the compressed air compressed by the compressor 22 and the gases flowing through the turbine 35. A shroud 263 is supported from the high pressure spool housing 182 and the scroll structure 23 by means of a plurality of pins, one of which is shown at 264. A diffuser structure 265 for the compressor 22 is sandwiched between the scroll 263 and the labyrinth seal structure 261. An inlet shroud 265 for the high pressure spool turbine 35 is supported from the labyrinth seal structure 261. The cylindrically shaped diffuser 38 for the high pressure spool turbine 35 is threaded into the rear housing 191 of the machine at 266. A sliding fluid tight connection between the shroud 265 and the diffuser 38 is provided by means of two piston rings 267 and 268 positioned in grooves in the diffuser 38 and engaging a cylindrical wall of the shroud 265.

As previously described, heated air from the recuperator structures 26 and 27 is supplied to the primary burner 31 by means of conduits 32 and 33. The primary burner 31 includes a housing 271 affixed to the rear housing 191 of the gas turbine engine, and an inner burner can or flame tube 272, shown in outline form. It is understood that the burner can or flame tube 272 is conventional in structure, and includes a plurality of holes which have not been shown in the drawing. The burner can or flame tube 272 is connected to an extension 273 of the scroll 36 by means of an intermediate structure, generally designated at 274. An end view of the primary burner 31 is shown in FIG. 16. Fuel is supplied from a fuel source to the burner nozzle 34 (shown in FIG. 8), which may be of the recirculating type, by means of a conduit 275. Conduit 276 carries the unused fuel from the burner nozzle 34 back to the fuel source. An igniter 277 extends through the wall of the housing 271 and the wall of the burner can or flame tube 272 to ignite the fuel-air mixture present in the burner when the engine is started.

The exhaust gases from the high pressure spool turbine 35 are delivered to a secondary or reheat burner, generally designated by the numeral 37 through the cylindrical conduit 38. The reheat burner 37 is shown in sectional view in FIG. 12, and is supported in portion 192 of rear housing 191 by means of a cover plate 281 which is secured to the portion 192 of the rear housing by a plurality of bolts, designated as 282 in FIG. 17. As can be seen by reference to FIG. 12, the reheat burner includes a burner can or flame tube 283 and an outer casing 284. It is understood that the burner can or flame tube 283 includes a plurality of holes which have not been shown in the drawing. FIG. 17 shows an end view of the secondary or reheat burner 37 including the supporting plate 281 and the bolts 282. Fuel is supplied from a fuel source to the nozzle of the reheat burner, which may be of the recirculating type, through a conduit 285. Fuel may be returned from the nozzle to the fuel source through a conduit 286. An igniter, designated by the numeral 287, extends through the supporting plate 281 and the burner can or flame tube 283 into the central portion of the burner. This igniter may be either of the electric glow plug type or the catalytic type, since the gases received by this burner have already been heated by the primary burner and are at a temperature considerably in excess of 900° F.

The casing 284 of the secondary or reheat burner 37 is affixed to the power turbine scroll assembly 42 by means of a joint, shown at 291. The turbine scroll assembly 42 supplies hot gases from the secondary or reheat burner 37 to the power turbine 41 through a nozzle assembly 43 (see FIG. 8).

The portion 193 of rear housing 191 of the gas turbine engine receives a reduction gear box housing, generally designated by the numeral 301 which is bolted to the back of the rear housing by a plurality of bolts, one of which is shown in FIG. 8 at 302. These bolts engage threaded holes in the rear housing as shown at 303 in FIG. 12. This reduction gear box housing supports the power turbine 41 and its shaft, and the output shaft of the engine. Means, including a planetary gear train, are positioned between the power turbine shaft and the output shaft of the engine for providing speed reduction.

Figure 2:
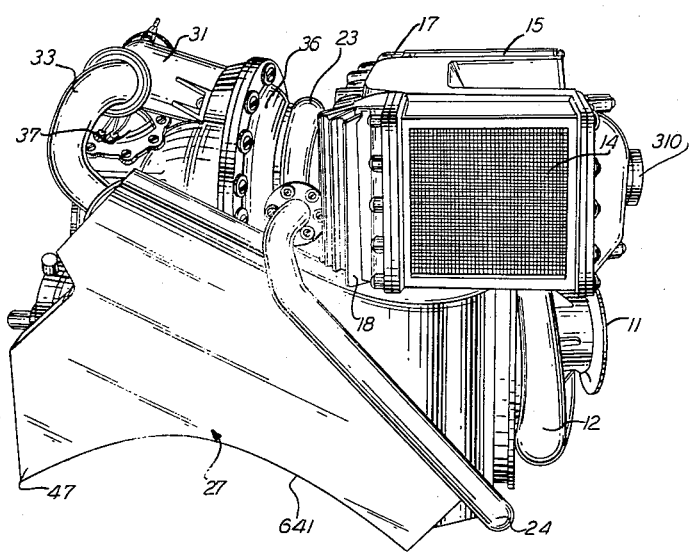
FIG. 2 is a side elevational view of the gas turbine engine of FIG. 1.

Referring now to FIG. 18 which is a sectional view taken along the lines 18—18 in FIG. 11, there is shown a drive means for an accessory pulley 310 which may be employed to drive engine accessories, such as, a power steering pump and a refrigerant compressor. In previous discussion in relation to FIG. 7, it was pointed out that a bevel gear 145 affixed to the fan shaft 95 of fan 16 meshed with a bevel gear 147 mounted on stub shaft 146, and that the stub shaft was mounted in fan housing member 139 by means of bearings 148 and 149. This stub shaft 146 and bevel gear 147 can be seen in FIG. 18. A sleeve 311 including a spur gear 312 is affixed to the shaft 146 for driving an intermeshing spur gear 313 affixed to shaft 314. The shaft 314 has affixed thereto the pulley 310. This pulley can be seen, in relation to the remainder of the engine, in FIGS. 1 and 2. Referring again to FIG. 18, the shaft 314 is supported in fan housing member 139 by ball bearing 315 and by sleeve bearing 316.

Engine oil from the engine lubricating system is supplied to conduit 321. From conduit 321 engine oil under pressure is supplied to sleeve bearing 316 through conduits 322, 323, 324 and 325. Oil is supplied to bearing 149 from conduit 323 by means of conduit 326 and to bearing 148 from conduit 324 by means of conduit 327. Oil is supplied to bearing 315 by means of conduits (not shown) positioned within the housing 139. Oil from the bearings described above is returned to the sump 101 by means of conduit 331 positioned in fan housing member 139 and by conduits 332 and 333 positioned in fan housing member 139 and low pressure spool housing 71, respectively. Referring again to FIG. 18, it can be seen that the portion of the fan housing member 139 which supports the shaft 314 and pulley 310 extends through the sheet metal member 253 which encloses the fan 16. For this purpose there is provided a collar 341 which receives the sheet metal member 253 in an annular groove 342, and which receives in a bore 343 the portion of the fan housing member 139 that supports the shaft 314 and pulley 310.

Referring now to FIG. 8, the reduction gear housing 301 supports bearing carrier 411 in which the output shaft 412 of the engine is rotatably supported.

The power turbine 41 includes a shaft 416 which is rotatably supported in the reduction gear housing 301 by means of a pair of anti-friction thrust bearings 417 and 418 and a sleeve bearing 433.

A planetary reduction gear train 504 couples the power turbine shaft 416 with the output shaft 412 and it includes a sun gear 531 formed integrally with the sleeve 422 which is keyed to power turbine shaft 416 by means of key 423 (see FIG. 8). The sun gear drives a plurality of planet gear assemblies, one of which is shown at 532. Each of the planet gear assemblies includes a first gear 533 engaging the sun gear 531 and a second gear 534 engaging a ring gear 535. Each of the planetary gear assemblies is mounted on a shaft of a planet carrier, designated by the numeral 536. These shafts, which are designated by the numeral 537, are hollow in configuration and carry sleeve bearings 541 and 542 for rotatably supporting the planet gear assemblies 532. The planet carrier 536 is rotatably supported in the bearing carrier 411 by means of a ball bearing 543.

It can be readily appreciated by an inspection of FIGS. 7 and 8 that the low pressure spool including low pressure spool compressor 11, shaft 51 and low pressure spool turbine 44, is axially aligned with the power turbine 41 and its shaft 416, as well as with the output shaft 412 which is affixed to the planet gear carrier 536.

Referring now to FIGS. 7, 8 and 10, it can be seen that the exhaust gases from the two-stage low pressure turbine 44 expand into diffuser 45. The diffuser 45 includes an inner sheet metal member 621 which surrounds the low pressure spool shaft 51 and the portion of the low pressure spool housing 71 which supports the shaft 51. The inner sheet metal member is welded or otherwise suitably affixed to a sleeve 622 which surrounds the bearing carrier 70. The bearing carrier 70 is provided with piston rings 623 and 624 which engage the sleeve 622 so that relative movement between the sleeve and the bearing carrier is permitted. The inner sheet metal member 621 is insulated from that portion of the low pressure spool housing 71 which supports the shaft 51 by means of blankets of insulating material, designated by the numeral 625. The insulating material prevents heat transfer between the exhaust gases in the diffuser 45 and the bearings 72 and 73 which support the low pressure spool shaft.

The diffuser 45 also includes an outer sheet metal member 626 which is welded or otherwise suitably secured to a flange member 579 which in turn is secured to the low pressure spool casing 130 by means of the bolts 576 and the nuts 581. The outer sheet metal member 626 may move relative to the low pressure spool casing 130 through a sheet metal shoulder affixed thereto at 627 which engages in sliding relationship an inwardly extending flange 628 of the casing 130. Insulating material 631 is also positioned between the outer sheet metal member 626 of the diffuser 45 and the casing member 130 to prevent large expansions and contractions of the casing member. The inner sheet metal member 621 and the outer sheet metal member 626 are generally cylindrical in shape so that the diffuser 45 surrounds the low pressure spool shaft 51 and the portion of the low pressure spool housing 71 which supports the shaft. At the end of the diffuser, adjacent the low pressure compressor 11, there is provided a pair of radially outwardly extending conduits, generally designated by the numerals 635 and 636, which can best be seen by reference to FIGS. 6 and 10.

Referring to FIG. 8, it can be seen that insulating material is also positioned about the reheat burner 37, the power turbine scroll 42 and between the shrouds for the low pressure turbine and the power turbine and the portion 193 of rear housing 191. In the interest of clarity this insulating material has been omitted from FIGS. 6, 12 and 20.

The structure of one of the recuperators which have been designated by the numerals 26 and 27 is fully shown and described in my copending application S.N. 70,463 as previously stated. This recuperator structure includes a casing element 641 which has an inlet 642 for the exhaust gases from the diffuser 45. The casing 641 bolts onto the low pressure spool casing member 130 at a position designated by the numerals 643 and 644 (FIG. 10).

As was previously discussed, the gas turbine engine of the present invention is provided with a combination starter-generator 231 which is geared to the high pressure spool shaft 205 through spur gear 233, idle gear 232, spur gear 213, shaft 212 and bevel gears 211 and 208. When the engine is to be started the combination starter-generator 231 is energized and as a consequence the high pressure spool shaft is rotated at a high speed. The compressor 22 of the high pressure spool draws air through the low pressure spool compressor 11, through scrolls 12 and 13, through intercoolers 14 and 15, through ducts 17 and 18 and discharges compressed air into the scroll 23. From the scroll 23, the compressed air is conveyed to the primary burner 31 through ducts 24 and 25, recuperators 26 and 27 and ducts 32 and 33. Fuel is supplied to the primary burner 31 through nozzle 34, and in the presence of igniter 277, which is suitably energized, the fuel-air mixture is ignited thereby supplying motive fluid for the high pressure turbine 35, for the power turbine 41 and for the low pressure spool turbine 44. When the low pressure spool rotates, the low pressure spool compressor 11 compresses air to be supplied to the high pressure spool compressor 23 and the engine begins to operate under its own power. After a suitable period, the starter-generator is de-energized and the reheat burner 37 is energized.

The high pressure spool, including compressor 22 and turbine 35, rotates at approximately 91,500 r.p.m. at the rated power to the engine and at approximately 70% of this speed at idle. The high pressure spool thus offers an excellent power source for operating engine accessories and in the engine, as described, the generator and engine oil lubricating pumps are powered from the high pressure spool. Additionally, a power steering pump and a refrigerant or air compressor may be operated from the pulley 310 driven from the high pressure spool. The accessories can thus be made smaller than those which must be employed with piston engines or simple cycle gas turbine engines in which all of the shafts rotate over a wide speed range, between idle and full power.

The substantially constant speed feature of the high pressure spool is also largely instrumental in producing good fuel economy over a broad spectrum of loads and speed, and particularly provides an advantage over simple cycle, low pressure gas turbine engines, that of good part load fuel economy.

As can readily be appreciated from the foregoing description, the objective of symmetry of design has been achieved by the provision of the twin intercoolers 14 and 15, and by the provision of twin recuperators 26 and 27 positioned on either side of the engine, as well, as by the provision of other features disclosed.

Furthermore, the ducts which carry the high temperature gases in the engine including cylindrical duct 38, which connects the high pressure spool turbine 35 with the secondary or reheat burner 37, the power turbine scroll assembly 42, and the diffuser 45, are mounted within the engine so that relative movement can take place between these parts and adjacent parts upon which they are mounted. Also, suitable insulating material has been provided between these ducts and portions of the housings of the engine located adjacent thereto.

A gas turbine engine constructed in accordance with the principles of this invention and having a power output of 300 horsepower at 100° F. weighs 650 lbs., including accessories and is 38 inches long, 29⅜ inches wide and 28⅜ inches high. With this size and weight the engine can easily be installed in the engine compartments of trucks and most passenger vehicles.

For a more complete description of certain of the elements and structures contained in the gas turbine engine disclosed in this application, reference may be had to our copending applications S.N. 70,463 and S.N. 70,460, now Patent 3,170,292.

The present invention thus provides a gas turbine engine, suitable for use in an automotive vehicle, which has a high horsepower to weight ratio and which has good fuel economy over a broad spectrum of loads and speeds.

It will be understood that the invention is not to be limited to the exact construction shown and described and that various changes and modifications may be made without departing from the spirit and scope of the invention, as defined in the appended claims.

We claim:

1. In a gas turbine engine, a low pressure spool including a compressor, a high pressure spool including a compressor, said high pressure spool being independently rotatable with respect to said low pressure spool, said high pressure spool being parallel to said low pressure spool and spaced vertically above said low pressure spool, a pair of cross flow air to air intercoolers, one of said intercoolers being positioned on one side of said high and low pressure spools and the other of said intercoolers being positioned on the other side of said high and low pressure spools, means connecting the compressor of said low pressure spool with each of said intercoolers, and means connecting each of said intercoolers with the compressor of the high pressure spool so that compressed air from the compressor of said low pressure spool flows through said intercoolers in a direction parallel to said high pressure spool and said low pressure spool, a fan positioned between said intercoolers and driven by said low pressure spool, said fan moving cooling air through both of said intercoolers in a cross flow relationship to the compressed air flowing through said intercoolers and received from the compressor of the low pressure spool.

2. A gas turbine engine comprising a low pressure spool housing, a high pressure spool housing, a rear housing, an accessory gear housing, a low pressure spool including a compressor and a turbine rotatably supported in said low pressure spool housing, a casing surrounding a portion of said low pressure spool housing and affixed to said low pressure spool housing and said rear housing, a reduction gear box housing positioned within said rear housing and affixed thereto, said reduction gear housing rotatably supporting a power turbine, said low pressure spool and said power turbine being positioned in contra-rotating axially aligned relationship, a high pressure spool including a turbine, a compressor rotatably supported in said high pressure spool housing and in said accessory gear housing, a pair of intercoolers, a first scroll connecting the compressor of said low pressure spool with one of said intercoolers, a second scroll connecting the other of said intercoolers with the compressor of said low pressure spool, said scrolls being supported by said low pressure spool housing, a pair of ducts connected to said intercoolers and merging into a structure for receiving said high pressure spool housing in a fluid tight sliding relationship, said high pressure spool housing having an inlet structure for the compressor of said high pressure spool, said inlet structure being positioned to receive fluid from said ducts, said high pressure spool housing being affixed to the rear housing of the engine, said rear housing supporting a primary burner connected to receive compressed air from the compressor of said high pressure spool and connected to deliver motive gases to the turbine of said high pressure spool, said rear housing also supporting a reheat burner having an inlet connected to receive effluent from the turbine of said high pressure spool and having an outlet connected to deliver motive gases to said power turbine and the turbine of said low pressure spool.

3. The gas turbine engine of claim 2 in which a pair of recuperators are provided, one of said recuperators being positioned on one side of the engine below one of said intercoolers, the other recuperator being positioned on the other side of said engine below the other of said intercoolers, a diffuser surrounding a portion of said low pressure spool and including a pair of conduits, one of said conduits being connected to one of said recuperators and the other of said conduits being connected to the other of said recuperators, each of said recuperators including an exhaust conduit, said recuperators also being connected to receive compressed air from the compressor of said high pressure spool, said compressed air from said compressor of said high pressure spool being heated by the effluent from said diffuser, and means connected to said recuperators and said primary burner for delivering the heated compressed air to said primary burner.

4. A gas turbine engine comprising a low pressure spool including a compressor and a turbine, a high pressure spool including a compressor and a turbine, said high pressure spool being independently rotatable with respect to said low pressure spool, the high pressure spool being positioned above the low pressure spool and in a parallel relationship with respect to the low pressure spool, a first intercooler positioned on one side of said high pressure spool and said low pressure spool, a second intercooler positioned on the other side of said high pressure spool and said low pressure spool, a first scroll connecting the compressor of said low pressure spool with the first intercooler, a second scroll connecting the compressor of the low pressure spool with said second intercooler, means connecting said intercoolers with the compressor of said high pressure spool, a plurality of engine accessories driven by said high pressure spool, a chamber positioned between said first intercooler and said second intercooler, said engine accessories being positioned within said chamber, a fan positioned in said chamber and driven by the low pressure spool, said fan drawing air from the atmosphere into said chamber and discharging cooling air through said intercoolers and over said engine accessories.

5. A gas turbine engine comprising a low pressure spool including a compressor and a turbine, a high pressure spool including a compressor and a turbine, a power turbine including a shaft, the axes of the low pressure spool, the high pressure spool and the power turbine being positioned in a vertical plane passing through the centerline of the engine, a burner connected to the turbine of the high pressure spool also being positioned in said vertical plane, a pair of intercoolers, one intercooler of said intercoolers being positioned on one side of the vertical plane and the other of said intercoolers being positioned symmetrically on the other side of the vertical plane with respect to the first mentioned intercooler, said intercoolers being connected between the compressor of said low pressure spool and the compressor of said high pressure spool, and a pair of recuperators, one of said receuperators being positioned on one side of the vertical plane, and the other of said recuperators being positioned symmetrically on the other side of said vertical plane with respect to said first mentioned recuperator, means for conveying exhaust gases of the engine through said recuperators, and means connected to the compressor of said high pressure spool for conveying compressed air to said recuperators, said recuperators containing means for providing heat exchange between the compressed air and the exhaust gases, and means connecting the recuperators with said burner for deliveriny the heated compressed air to said burner.

6. A gas turbine engine comprising a low pressure spool including a compressor and a turbine, a high pressure spool including a compressor and a turbine, a power turbine, a burner connected to supply motive fluid to said turbines, the axes of said low pressure spool, said high pressure spool, said power turbine and said burner defining a plane passing through said engine, a first recuperator connected between the compressor of said high pressure spool and said burner and being positioned on one side of said plane, a second recuperator connected between the compressor of said high pressure spool and said burner and being positioned symmetrically on the other side of said plane with respect to said first recuperator, both of said recuperators being connected to receive exhaust gases from said power turbine and the turbine of said low pressure spool, said recuperators containing means for transferring energy from the exhaust gases to the compressed air, a first intercooler connected between the compressor of said low pressure spool and the compressor of said high pressure spool and being positioned on one side of said plane, a second intercooler connected between the compressor of said low pressure spool and the compressor of said high pressure spool and being positioned symmetrically on the other side of said plane with respect to the first intercooler.

7. In a gas turbine engine, a low pressure spool including a compressor, a high pressure spool including a compressor, said high pressure spool being independently rotatable with respect to said low pressure spool, an intercooler connected between the compressor of the low pressure spool and the compressor of the high pressure spool, and a fan driven by the low pressure spool positioned adjacent said intercooler for forcing cooling air through said intercooler.

8. In a gas turbine engine, a low pressure spool including a compressor, a turbine, and an interconnecting shaft, a high pressure spool including a compressor and a turbine, said high pressure spool being independently rotatable with respect to said low pressure spool, a pair of intercoolers, one of said intercoolers being positioned above and outboard from said low pressure spool, the other of said intercoolers being positioned above and outboard from said low pressure spool but on the opposite side of the engine from said first intercooler, a first scroll connecting said first intercooler with the compressor of said low pressure spool, a second scroll connecting said second intercooler with the compressor of said low pressure spool, means connecting both of said intercoolers with the compressor of said high pressure spool, a fan positioned between said intercoolers, a fan shaft, said fan being affixed to said shaft at one end, a bevel gear affixed to said shaft at the other end, a bevel gear affixed to the interconnecting shaft of said low pressure spool and engaging the bevel gear affixed to the fan shaft.

References Cited by the Examiner

UNITED STATES PATENTS

| | | | |
|---|---|---|---|
| 2,073,191 | 3/37 | Belluzzo | 60—39.16 |
| 2,473,356 | 6/49 | Birmann | 60—35.6 |
| 2,608,054 | 8/52 | Price | 60—39.18 |
| 2,625,012 | 1/53 | Larrecq | 60—39.51 |
| 2,631,427 | 3/53 | Rainbow | 60—39.16 |
| 2,672,010 | 3/54 | Newcomb | 60—39.08 |
| 2,711,074 | 6/55 | Howard. | |
| 2,787,886 | 4/57 | Wood | 60—39.17 |
| 2,791,091 | 5/57 | Wheatley et al. | 60—39.66 |
| 2,861,421 | 11/58 | Hockert et al. | 60—39.08 |
| 2,862,356 | 12/58 | Kent et al. | 60—39.16 |
| 2,925,954 | 2/60 | Spillman et al. | 230—182 X |
| 2,933,886 | 4/60 | Sharma | 60—39.66 X |
| 2,940,257 | 6/60 | Eckert et al. | 60—39.66 |
| 2,940,660 | 6/60 | Caddell | 230—211 |
| 2,960,825 | 11/60 | Sampietro | 60—39.16 |
| 2,978,869 | 4/61 | Hiscock | 60—39.16 |
| 3,077,074 | 2/63 | Collman | 60—39.16 |

FOREIGN PATENTS

| | | |
|---|---|---|
| 620,983 | 4/49 | Great Britain. |
| 695,891 | 8/53 | Great Britain. |

SAMUEL LEVINE, *Primary Examiner.*

ABRAM BLUM, *Examiner.*